Figure 3:
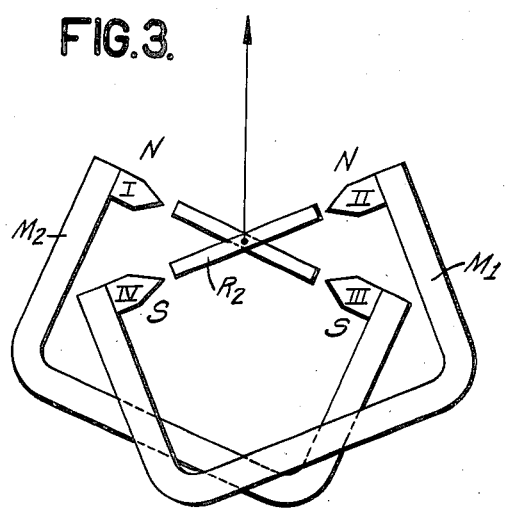

July 28, 1942.　　　　E. KRAMAR　　　　2,290,974
DIRECTION FINDING SYSTEM
Original Filed Aug. 24, 1938　　2 Sheets-Sheet 1
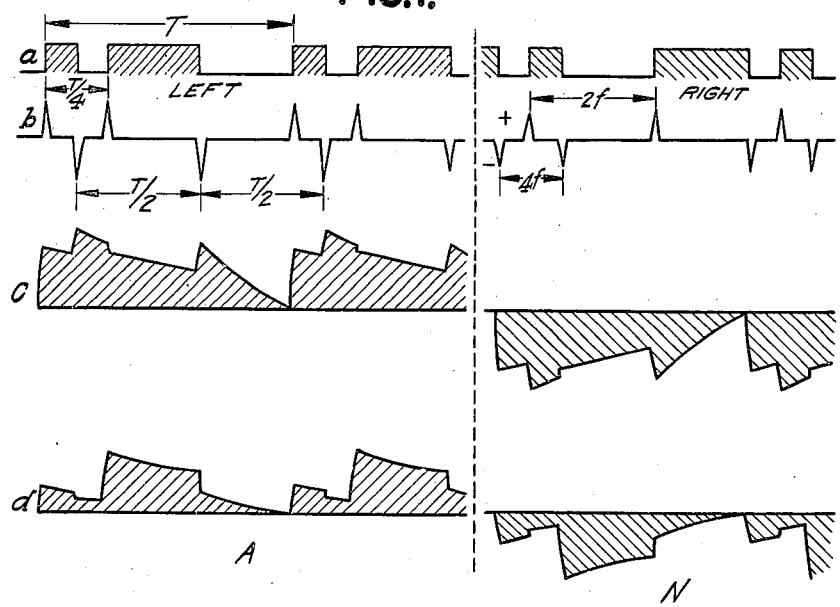
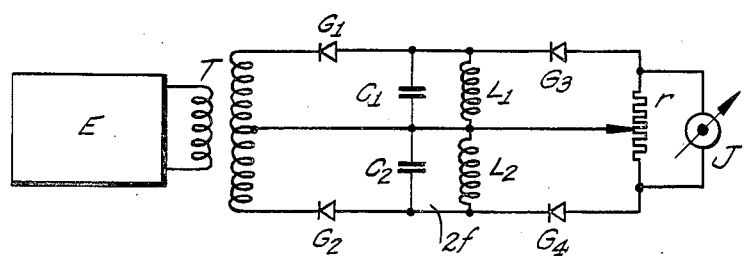
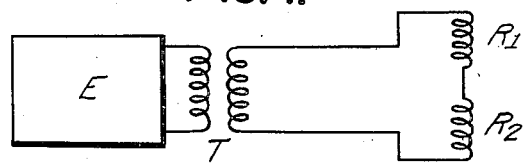
INVENTOR.
ERNST KRAMAR
BY
ATTORNEY.

July 28, 1942.   E. KRAMAR   2,290,974
DIRECTION FINDING SYSTEM
Original Filed Aug. 24, 1938   2 Sheets-Sheet 2

INVENTOR.
ERNST KRAMAR
BY
ATTORNEY.

UNITED STATES PATENT OFFICE 2,290,974

DIRECTION FINDING SYSTEM

Ernst Kramar, Berlin, Germany, assignor to C. Lorenz Aktiengesellschaft, Berlin-Tempelhof, Germany, a company Original application August 24, 1938, Serial No. 226,473, now Patent No. 2,241,915, dated May 13, 1941. Divided and this application October 5, 1940, Serial No. 359,950. In Germany August 8, 1937

3 Claims. (Cl. 250—11)

This application is a division of the U. S. application Ser. No. 226,473, filed August 24, 1938, Pat. #2,241,915, dated May 13, 1941.

In order to obtain course lines for vehicles, such as aeroplanes and vessels, it is well known to compare with each other the intensities of high frequency fields which are of more or less directional character. These high frequency fields are to such end keyed in the rhythm of complementary signals and in such manner that the signal of one field shall precisely fall in the periods of no keying of the second field. Through the equality of the amplitudes of the two received fields a course line is afforded which corresponds to the center line of the two directional fields and which the pilot uses as a course indication. This method of comparing field intensities may be effected by means of directional transmitters or by means of directional receiving stations. In both cases two directional characteristics are alternately produced which overlap each other, the desired course line agreeing with the line defined by the points of intersection of the two alternately generated directional characteristics or diagrams. The method operating with the aid of directional transmitters is in general designated as radio beacon method, while the method operating with directional receivers is designated as destination steering method. In the radio beacon method either directional antennae are used, these being alternately connected and disconnected, or a continuously fed energizing antenna and alternately keyed reflector antennae are employed, whereas in the destination steering method a combination of frame antennae and open antennae is used, either the frame antenna effect or the effect of the open antennae being periodically inversed.

The invention described hereafter relates to a method of indicating course lines obtained by comparing the amplitudes. The known methods of this kind employ either acoustic indication or visual indication. In the case of the acoustic indication, as long as the course line is followed the pilot hears a continuous tone in his headphones, whereas whenever he happens to be off the course line the signal of one or the other kind will preponderate. With the visual indication effected by means of a pointer instrument the directional high frequency fields are not keyed in the rhythm of complementary signals, this mode being adopted for the acoustic indication, but are modulated with tone frequencies to which selective members connected with the receiving apparatus are tuned, such members being oscillating reeds, for example. This method has the fundamental disadvantage that acoustic and visual indication cannot be effected both at the same time. This, however, is necessary if the method is to be employed on board aircraft, since the pilot when observing his navigation instruments must make use of the acoustic indication while during a wireless intercommunication he is to depend upon the visual indication. There is up to date only one method adapted for a simultaneous acoustic and visual indication. In this method the directional antennae are keyed in the dot-dash rhythm, while the received signals are conveyed to an indicating instrument which is very sensitive in its zero position while being as far as possible insensitive in the range of the maximum deflection of the pointer. This instrument is influenced by induction pulses produced in a transformer by the signal flanks, that is, the peak voltages produced at the beginning and end of a D. C. impulse impressed on the transformer primary. Such known method however requires the keying to be in the rhythm of signals of the kind composed of elemental signals which are of the same length. This is only so if the keying is in the dot-dash rhythm, that is, if on one side only dots and on the other side only dashes are produced. The dot-dash keying however has a disadvantage which is due to the nature of the human ear, because the summated signal of each side, that is, the integral value of the elemental signals thereof is different from that of the other side, whereby it is rendered difficult to compare the sound intensities with each other. Therefore it is of advantage to do away with the dot-dash keying and instead to key in the rhythm of complementary signals of the kind which when summated result in the same integral values. The letters A and N, or U and D or the like are signals of this kind. These signals when summated equal one another in a manner to allow of readily comparing them by hearing. They are however composed of dots and dashes, that is, are composed of elements which are different in length and thus render it impossible to make use of the indicating instrument employed in connection with the dot-dash keying, namely an instrument which is very sensitive in its zero position while being little sensitive in the outer positions of its pointer.

The invention discloses a novel indicating method that enables acoustic and visual indication to be effected both at the same time even in the case of keying signals composed of differently long elemental signals. The acoustic indication is facilitated, as the elemental signals may be so chosen that the integral values of the two signals shall equal one another.

One feature of the invention is that the induction pulses, produced in a transformer by the signal flanks and employed in known manner for the dot-dash keying, are used in connection with keying methods of the kind employing signals composed of differently long elemental signals. This novel application of such indication pulses should not be considered a mere mechanical skill since the induction pulses are different in direction and also are different in frequency. By the invention methods are disclosed which shall enable such induction pulses to be utilized for effecting a visual indication.

The pertinent conditions are explained in the following with reference to A—N keying taken as an example.

Figure 5:
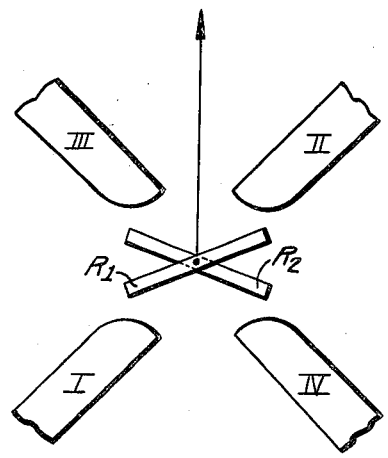
Figure 6:
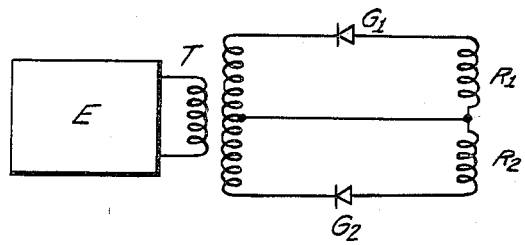
Figure 7:
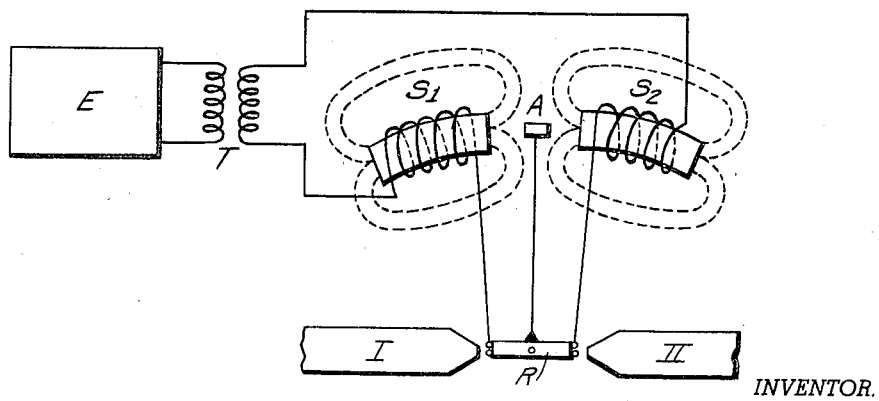

In the accompanying drawings Fig. 1 is a graphical representation that relates to the said induction pulses, Fig. 2 is a wiring diagram showing one embodiment of the invention, Fig. 3 is a schematic view illustrating a form of the indicating instrument of an arrangement adapted for effecting the novel method, Fig. 4 is a wiring diagram of such arrangement, Fig. 5 is a schematic view representing another form of indicating instrument, Fig. 6 shows the appertaining circuit arrangement, Fig. 7 is a diagrammatic view of still another embodiment of the invention.

On the left in Fig. 1 the particulars relating to the letter A are represented while on the right hand side thereof the inverse particulars, relating to letter N, are plotted. The received and rectified signals, Fig. 1, a, are conveyed to a transformer in which the signal flanks act to produce induction pulses, Fig. 1, b. If the keying period is designated T then two induction pulses originate which are different in direction. As regards letter A, the positively directed impulses are of the period T/4 while the negatively directed impulses are of the period T/2. As to letter N the conditions are the reverse of the former. Therefore, the negatively directed impulses of the letter A have a frequency 2f and the positively directed impulses a frequency 4f, where f denotes the keying frequency. Accordingly the positively directed impulses of letter N have the frequency 2f while the negatively directed impulses thereof are of the frequency 4f. The indicating method as provided by the invention is based on these relationships. The method preferably adopted for effecting the invention consists in rectifying the impulses and then delivering them to oscillatory circuits, the voltages or currents originated in these circuits being rendered effective by a differential indicating instrument.

This method may be effected with the aid of the arrangement shown in Fig. 2. The mode of action here is as follows: The keying signals arriving in the receiver E are amplified and rectified and then conveyed to a transformer T which acts to transfer the signal flanks as induction pulses. Such impulses are rectified in rectifiers G1, G2 and are then delivered to oscillatory circuits C1, L1 and C2, L2 which are tuned to the frequency 2f. For instance, if letter A is in preponderance of letter N, circuits C1, L1 will be in resonance with the frequency of the received induction pulses whereas when letter N is received the rectification causes circuit C2, L2 to be resonant. The resonant voltage of these circuits is in its turn rectified and conveyed to a differential indicating instrument which may be a standard moving coil instrument J having a potentiometer r allotted to it. According to which resonance voltage is higher the pointer of the instrument will be deflected either to the right or the left. Such instrument may of course be so connected as to utilize the current instead of utilizing the resonance voltage. Since the pointer deflection thereof is of special invariable values a proper calibration will enable the angle of deviation from the course line to be immediately ascertained by reading.

The other indicating methods here concerned are likewise based on the principle of induction pulses rendered effective in instruments of special kind. The instrument represented in Fig. 3 has two magnet systems M1, M2 provided with pointed pole pieces I, II, III, IV. Between these pole pieces a cross coil is arranged to move. As shown in Fig. 4, the coils R1, R2, thereof are connected in series with the receiving apparatus E over pulsing transformer T. The mode of action of this instrument is explained with reference to the graphic representation shown in Fig. 1, c which is a graph of the pointer deflection. Let it be supposed that in the case of letter A a positive impulse arrives. As coils R1, R2 are in the maximum field of the pole pieces and are connected in series there results a maximum deflection with double the intensity of the arriving impulse, for instance a deflection to the right. Coil R1 therefore rotates to leave the two magnet fields while coil R2 moves out of the field of magnet M1 to enter the oppositely directed field of magnet M2. The pointer instrument slightly moves back, as will be seen from Fig 1, c. The next following negative impulse however rapidly moves the pointer back to the right, since only coil R2, now located in the oppositely directed field of magnet M2, is effective. The coil is now likewise in a field of the two magnets which is of very low intensity so that the ensuing positive impulse entails only a small backward movement of the pointer. The pointer is thus slowly returning, coil R2 again entering the field of magnet M2. The negative impulse however which now occurs rapidly moves the pointer to the right and then allows it slowly to return into the zero position. When receiving the letter N the resultant conditions are the reverse of the former so that the pointer is deflected to the other side.

The indicating device shown in Fig 5 likewise comprises a cross coil instrument, with the difference however that the two systems are not located in one plane but are located one above the other, that is to say, system I, II and coil R1 are arranged in one plane whereas system III, IV and coil R2 are arranged in a second plane located either above or below the former. As will be understood from Fig. 6, the induction pulses are here rectified by the rectifiers G1, G2 and each impulse direction is only rendered effective either in coil R1 or in the coil R2. The curve of pointer deflection for this system is shown in Fig. 1d. Let us again suppose that the signal A is received in preponderance of signal N. The first positive impulse be supposed to become effective in coil R2, for instance. The pole pieces III, IV are so shaped that with increasing deflection the coil R2, moving to the right, enters a field of increasing intensity. The moving coil system is therefore rapidly moved to the right by such first positive impulse, coil R2 entering a strong field while coil R1 is moved out of the field of the pole pieces I, II, belonging to it. The negative impulse which now arrives and which in consequence of the rectification becomes effective in coil R1 only, merely causes a slight retrograde movement. The instrument in this way slowly moves back through a small angle, coil R2 thus remaining in a strong field. The ensuing positive impulse therefore acts to move the pointer rapidly to the right, the deflection thereof having to be multiplied by the field increase. After the ensuing small retrograde movement of the pointer the coil R1 is still outside the field so that the negative impulse which then occurs only causes a small retrogradation, the pointer then slowly returning into the position of rest. In the case of letter N the conditions are again the reverse of the former so that the deflection will be in the opposite direction.

The indicating instrument shown in Fig. 7 acts to utilize, for determining the direction of the pointer deflection, the first incoming impulse only, while the ensuing impulses merely serve to hold the pointer after deflection. Thus, if at first a positive impulse arrives, as is the case with signal A, the pointer is rapidly deflected to the right while the ensuing impulses do not vary such position of the pointer but act to maintain it in this position. In the case of signal N the pointer is by the first negative impulse rapidly moved to the other side and is held in such position by the ensuing impulses, the direction of these being not of importance here. This instrument is a combination of a moving coil instrument and a soft iron instrument. By the moving coil instrument the direction is determined in accordance with the first incoming impulse, whereas the other impulses act on the soft iron portion, thus being independent of directions. The moving coil instrument is such that the incoming impulse acts to move it out of the field of the appertaining magnet system so that the additional impulses shall not be able to influence this instrument.

In Fig. 7, which represents one embodiment of arrangements of the latter kind, I, II denote two magnet poles while R indicates the moving or rotary coil. The soft iron portion comprises solenoids S1, S2. All of the coils are connected in series and are joined to receiver E over the pulsing transformer T. Coil R carries a soft iron armature A which is under the influence of the solenoids. Let us suppose at first a positive impulse arrives. This impulse causes coil R to turn to the right, thus leaving the field of the magnet system I, II. The magnetic fields of the solenoids are indicated in dotted lines in order to explain the mode of action. The movement of coil R entails that the armature A enters the field of solenoid S2. This field is influenced by the ensuing impulses and thus causes to attract the armature A. The impulse direction is not of importance in this regard. After the signal has been finished the instrument reassumes its position of rest. An induction pulse opposite to the former causes coil R to be deflected in the other direction and the pointer to be influenced by solenoid S1.

It is to be understood that the indication methods here disclosed are not restricted to the A—N keying, but may be suited to any other mode of keying effective through signals composed of differently long elemental signals, the attenuation having to be calculated accordingly.

What is claimed is:

1. A direction finding receiver for visual indication by comparison of signals, each signal including signal elements of different lengths, comprising means for receiving and detecting said signals, means for producing from the detected signal elements induction impulses of opposite polarity indicating the beginning and the end of each signal element, whereby the signals are distinguished from one another by the polarity and grouping of the produced signal impulses, an instrument having a deflecting coil, a pointer operatively displaced by said deflecting coil, means for applying said produced impulses to said coil, the first induction pulse of a signal causing deflection of said coil and displacement of said pointer, and additional means responsive to the following produced impulses of said signal for maintaining said pointer displaced.

2. A system and method as defined in claim 1, wherein the said pointer instrument comprises a portion sensitive to the direction of the said induction pulses and also comprises a portion which is insentitive to such direction.

3. A system and method as defined in claim 1, wherein the said pointer instrument comprises a moving coil portion, and a soft iron portion for maintaining the pointer of said instrument displaced.

ERNST KRAMAR.